Feb. 2, 1932.                M. SILBERMAN                 1,843,843
              METHOD OF AND BUILDING FOR GARAGING MOTOR VEHICLES
                        Filed Nov. 19, 1929        2 Sheets-Sheet 1

WITNESSES
Edw. Thorpe
A. T. Sperry

INVENTOR
M. Silberman
BY
ATTORNEY

Feb. 2, 1932. M. SILBERMAN 1,843,843
METHOD OF AND BUILDING FOR GARAGING MOTOR VEHICLES
Filed Nov. 19, 1929 2 Sheets-Sheet 2
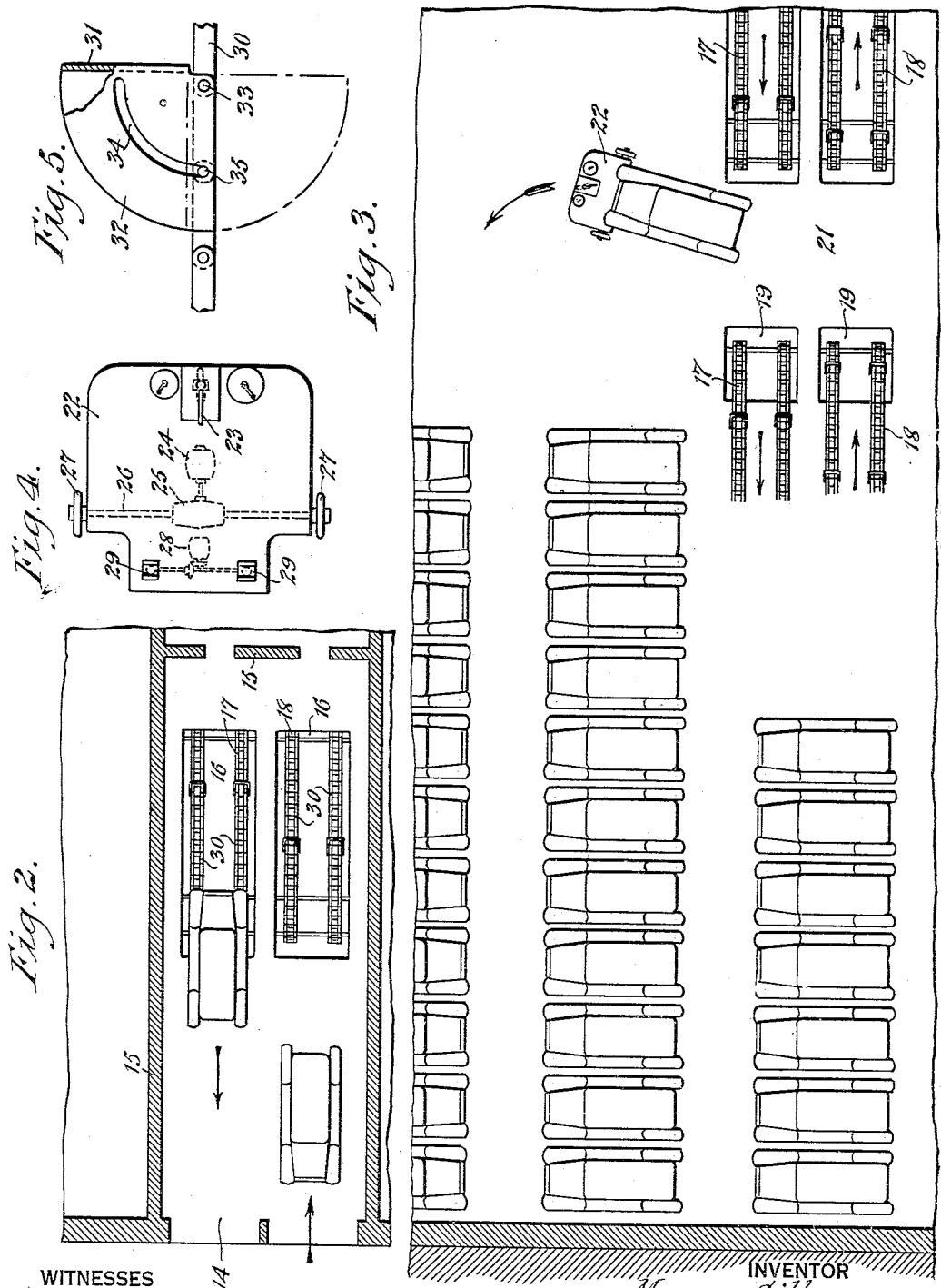

Patented Feb. 2, 1932

1,843,843

UNITED STATES PATENT OFFICE

MURRAY SILBERMAN, OF NEW YORK, N. Y.

METHOD OF AND BUILDING FOR GARAGING MOTOR VEHICLES

Application filed November 19, 1929. Serial No. 408,343.

This invention relates to method of and building for garaging motor vehicles.

It is among the objects of the present invention to provide a novel and improved garage system, including inclined conveyors which are adapted to move the motor vehicles from one floor to another of a building.

A further object of the present invention is to provide in a building, a plurality of floors and interconnecting conveyors whereby a vehicle may be moved without use of its own power from one floor to another of the building.

A further object of the present invention is to provide a system of the class described, including automobile jacks, which may engage the motor vehicle to move it about the floor of the building without use of the power of the vehicle.

Another object of the present invention is to provide a novel and improved system whereby the arrangement is such that maximum parking capacity may be secured in minimum space.

Other objects of the present invention will be apparent from a consideration of the following specification taken in conjunction with the accompanying drawings, in which Figure 1 is a vertical section through a building embodying one form of the present invention;

Fig. 2 is a sectional view taken on lines 2—2 of Fig. 1;

Fig. 3 is a sectional view taken on lines 3—3 of Fig. 1;

Fig. 4 is a top plan view of the automobile jack used in the present system, and Fig. 5 is a detail view of the conveyor belt showing the vehicle abutment thereon.

Figure 1:
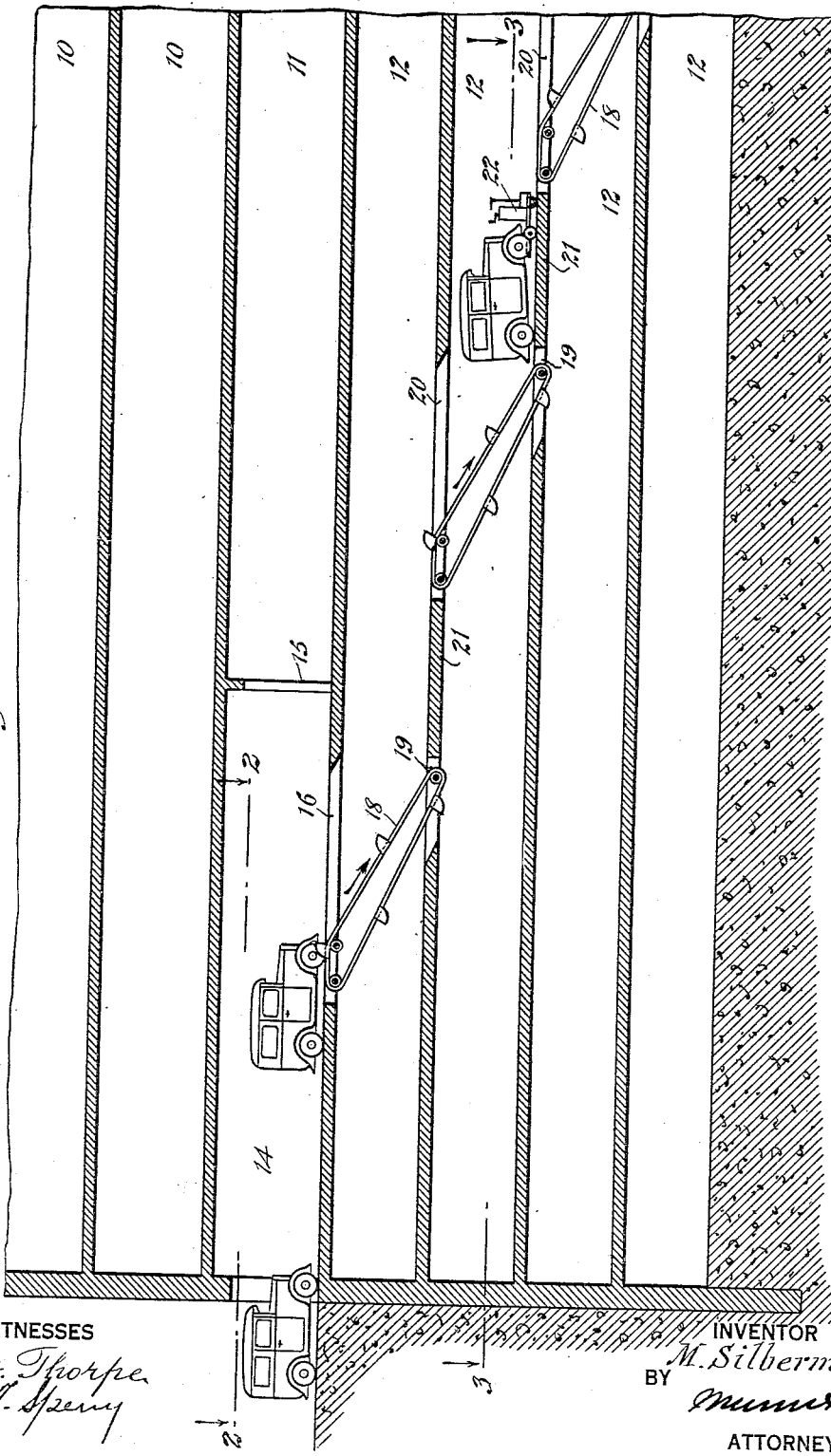

Referring more particularly to the drawings, it will be seen that the present invention is applicable to various types of buildings. The building illustrated in Fig. 1, includes the upper floors 10 above ground level, the ground level floors 11, and the sub-ground level floors 12.

The present invention is particularly adapted for use in office buildings, stores, and the like, and is arranged to provide parking space in sub-ground level floors, such as those indicated at 12. It will be understood that the invention may be used for the upper floors of the building, if such an arrangement is desired. As shown in Figs. 1 and 2, the ground level floor is provided with an entrance and exit vehicle runway 14. The runway 14 is divided from the remainder of the ground level floor 11, by partitions 15. It will be understood that, if desired, the remaining ground level may be used for the storage of vehicles, but as the present invention is particularly designed for the storage of vehicles under the ground level, the construction here shown provides the partitions 15, which permits the use of all of the remaining ground floor for office or store space. Associated with the runway 14 and extending through apertures 16 of the floor thereof, raising and lowering inclined conveyors 17 and 18, respectively, are provided. The lowering conveyor 18 is positioned on the right side of the runway going in, while the raising conveyor 17 is positioned on the right side of the runway going out, as indicated by the arrows in Fig. 2. A vehicle entering the building moves to the position as shown in Fig. 1, with its front wheels on the conveyor and abutting the movable abutment of the conveyor shown in Fig. 5, which will be hereinafter described. The conveyor is then moved in the direction of the arrow in Fig. 1, and the vehicle is moved thereby to the next floor. In passing from the building, the vehicle is carried up by the conveyor 17 to the runway 14 and moves under its own power therefrom.

Referring more particularly to the intermediate sub-ground level floors, it will be seen that each is provided with a small aperture 19 for the reception of the lower end of the conveyors and with a larger aperture 20 with which the upper end of the next floor conveyor is associated for the upward or downward movement of vehicles therethrough. Between the apertures 19 and 20, a substantial platform 21 is provided which, as indicated in Fig. 3, permits the vehicle to be moved to the side out of alinement with the conveyors, to be directed on the floor, or, if desired, the vehicles may move thereover to the next adjacent lowering or elevating conveyor.

For moving the vehicles about the floor, thus to obviate the necessity of the vehicles operating under their own power and thus discharging noxious exhaust gases into the building, automobile jacks, as shown in Fig. 4, and generally indicated by the numeral 22, are provided. The automobile jacks are provided with a single front steering wheel 23, a propelling motor 24 being associated by suitable gearing indicated at 25 with the rear axle 26 of the driving wheels 27. The assembly further includes a motor 28, which is adapted to operate the jack elements 29, which elements are adapted to receive the axle of the vehicle, and by energization of the motor raises the front wheels of the vehicle from the floor. The single front steering wheel of the jack provides for the turning of the jack in minimum space, and it will be seen, as illustrated in Figs. 1 and 3, that the automobile jack may be used to move the vehicles from the platform 21 and into parking space on the floor associated therewith.

Referring more particularly to the conveyor, they are preferably formed of pairs of uniformly moving conveyor belts or chains 30, as shown in Fig. 2. On parallel portions of the chains, movable abutments, as shown in Fig. 5, are provided. The abutments are adapted to receive the front of the vehicle wheel and thus prevent the vehicle from moving with respect to the conveyor belt. The abutment includes a transversely extending portion 31 and side flanges 32. The abutment is pivoted, as at 33, to the belt 30, and is provided with an arcuate aperture 34, through which a guide pin 35 extends for guiding the pivotal movement thereof, the arrangement being such that in case of emergency, the abutment may be moved so that the portion 31 is parallel with the chains, thus permitting movement of the vehicle over the conveyors under their own power, using the conveyors as ramps for the movement of the vehicles.

From the foregoing it will readily be seen that the invention provides a novel and improved method of and building for the garaging of motor vehicles. It is understood that the invention is not confined to the specific structural details herein disclosed but that numerous changes, modifications, and the full use of equivalents may be resorted to without departing from the spirit or scope of the invention as outlined in the appended claims.

What is claimed is:

1. A motor vehicle housing system, including a housing structure for motor vehicles, having a ground floor and a plurality of sub-ground floors, together with means for conveying motor vehicles therebetween, said means comprising flexible inclined belt conveyors, the lower end of said conveyors being positioned upon each floor in spaced relation from the upper end of the conveyors of the floor beneath, whereby between said conveyors a platform is provided for a motor vehicle.

2. A motor vehicle housing system, including a housing structure for motor vehicles, having a ground floor and a plurality of sub-ground floors, together with means for conveying motor vehicles therebetween, said means comprising flexible inclined belt conveyors, the lower end of said conveyors being positioned upon each floor in spaced relation from the upper end of the conveyors of the floor beneath, whereby between said conveyors a platform is provided for a motor vehicle, said system further including means for moving said motor vehicle from said platform to its associated floor.

3. A motor vehicle housing system, including a housing structure for motor vehicles, having a ground floor and a plurality of sub-ground floors, together with means for conveying motor vehicles therebetween, said means comprising flexible inclined belt conveyors, the lower end of said conveyors being positioned upon each floor in spaced relation from the upper end of the conveyors of the floor beneath, whereby between said conveyors a platform is provided for a motor vehicle, said system further including means for moving said motor vehicle from said platform to its associated floor or across said platform to the next floor.

4. A motor vehicle housing system, including a housing structure for motor vehicles, having a ground floor and a plurality of sub-ground floors, together with means for conveying motor vehicles therebetween, said means comprising flexible inclined belt conveyors, the lower end of said conveyors being positioned upon each floor in spaced relation from the upper end of the conveyors of the floor beneath, whereby between said conveyors a platform is provided for a motor vehicle, said system further including means for moving said motor vehicle from said platform to its associated floor or across said platform to the next floor, said means including an automobile jack adapted to raise the front of the vehicle and to propel it from the platform.

5. In a motor vehicle housing system, a structure with a plurality of floors, a plurality of inclined conveying means disposed between the floors respectively and in alignment, the top of a conveying means disposed between an upper and a lower floor being spaced from the bottom of the conveying means disposed between the said upper floor and a floor thereabove to permit of the movement of a motor vehicle out of said alignment.

MURRAY SILBERMAN.